United States Patent Office 2,754,341
Patented July 10, 1956

2,754,341
AROMATIC ALKYLATION

Earl Vance Kirkland, La Marque, Tex., assignor to The American Oil Company, a corporation of Texas No Drawing. Application May 13, 1954,
Serial No. 429,680

4 Claims. (Cl. 260—671)

This invention relates to the alkylation of aromatic hydrocarbons in the presence of a catalyst consisting of solid phosphoric acid promoted with $BF_3$.

An object of the invention is the preparation of isopropylaromatic hydrocarbons by alkylating aromatic hydrocarbons with propylene in the presence of a catalyst consisting of solid phosphoric acid promoted with $BF_3$. A particular object is the alkylation of aromatic hydrocarbons with propylene in the presence of solid phosphoric acid-$BF_3$ catalyst under conditions to improve catalyst life. The preferred object of the invention is the preparation of isopropylxylenes by alkylation of xylene with propylene in the presence of a solid phosphoric acid-$BF_3$ catalyst under conditions to give long catalyst life.

The invention concerns an alkylation process wherein an aromatic hydrocarbon is reacted at a constant pressure with propylene, in the presence of a catalyst consisting of solid phosphoric acid saturated with $BF_3$; $BF_3$ is continuously introduced into the reaction zone during the period of contacting of the aromatic hydrocarbon and the propylene. A reaction product mixture is separated from the solid catalyst and isopropylaromatic hydrocarbons are recovered from the reaction product mixture.

The catalyst utilized in this process consists of a solid phosphoric acid saturated with $BF_3$. The solid phosphoric acid component of the catalyst may be the conventional solid phosphoric acid catalyst utilized for polymerization of refinery butylene streams; this commercial catalyst is commonly known as UOP polycatalyst. In general, the solid phosphoric acid consists of between about 50 and 75 weight percent of phosphoric acids such as orthophosphoric and pyrophosphoric acid. The acid is adsorbed on a carrier of a siliceous character. Examples of these carriers are diatomaceous earth, kieselguhr, silica gel, aluminum silicate, fuller's earth, bentonite, and acid treated clays. The acid and the adsorbent are mixed together and usually extruded to form shaped particles. The shaped particles are then dried at a temperature of from about 350° to about 500° F. The dried particles are calcined further at temperatures generally from about 500° to about 1000° F. It is to be understood that all the various solid phosphoric acids known to the art are intended to be included within this description and the above description is not to be considered as limiting the type of solid phosphoric acid usable in the process of this invention.

The catalyst of this invention is prepared by exposing solid phosphoric acid to gaseous $BF_3$ at the desired temperature of alkylation until the solid phosphoric acid has become saturated with the $BF_3$. The saturation point is most readily determined by the appearance of $BF_3$ in the effluent from the chamber containing the solid phosphoric acid.

The process involves the reaction of propylene with aromatic hydrocarbons. These may be either monocyclic or polycyclic, such as naphthalene, methylnaphthalene, anthracene. The monocyclic hydrocarbons may be either benzene or alkylbenzenes, such as toluene, ethylbenzene, xylene mesitylene and durene. Particularly good results are obtainable with the various xylene isomers.

The process may be carried out at various temperatures. The aromatic hydrocarbon must be in the liquid state and therefore the operating temperature must be above the melting point of the particular aromatic hydrocarbon charged. In general, the process is carried out at temperatures between about 25° C. and 150° C. When operating with xylene as the feed, it is preferred to use a temperature between about 70° C. and 100° C.

The process is carried out under conditions to maintain substantially constant pressure in the reaction zone. In batch operations, this constant pressure is readily maintained by venting some of the gaseous material from the reaction zone. In continuous operation, obviously the reaction zone will be at substantially constant pressure.

The amount of propylene utilized will be dependent upon the type of isopropylaromatic hydrocarbon desired. The molar ratio of propylene to aromatic hydrocarbon is not an essential feature of the process. However, it is preferred to maintain an external molar ratio of propylene to xylene of between about 0.1 and 2. The molar ratio is expressed as external ratio because in batch operations wherein the propylene is introduced over a period of time, the total amount of propylene charged is much larger than the amount of propylene present in the reaction zone at any particular instant. Thus, external mol ratio is intended to mean the ratio of total amount of propylene charged to the reaction zone to the total amount of aromatic hydrocarbon charged.

When the solid phosphoric acid-$BF_3$ catalyst, i. e., a solid phosphoric acid saturated with $BF_3$ at operating temperature and pressure, is used to catalyze the reaction of aromatic hydrocarbon and propylene, the catalyst very rapidly loses its activity. In other words, the solid phosphoric acid-$BF_3$ catalyst has an extremely short life. The life of the catalyst is prolonged almost indefinitely when gaseous $BF_3$ is introduced continuously into the reaction zone during the course of the alkylation reaction. When propylene is introduced into the reaction zone more or less continuously, the $BF_3$ is introduced into the reaction zone during the time of propylene addition. In batch operations, wherein the total amount of aromatic hydrocarbon and propylene are introduced into the reaction zone in a single addition, improved results are obtained by adding $BF_3$ continuously to the reaction zone over the period of time required to obtain the desired consumption of propylene.

The amount of $BF_3$ introduced into the reaction zone during the alkylation reaction time will vary with the particular feed and the particular operating conditions. In general, the $BF_3$ addition rate is between about 0.02 and 0.1 mol per mol of aromatic hydrocarbon per hour of contacting time. When xylene is the feed, it is preferred to use about 0.05 mol of $BF_3$ per mol of xylene per hour of reaction time.

The alkylation reaction is not a rapid one and therefore sufficient time must be allowed in the reaction zone to obtain the desired amount of propylene reaction. The reaction time is known to be affected by the temperature, catalyst activity, the type of aromatic hydrocarbon, etc.

The results obtainable by the process of this invention are illustrated by the following examples, which examples are not to be construed as limiting the scope of the invention.

The tests were carried out using a Pyrex glass reactor. The reactor was two inches in diameter and 30 inches overall length. Near the lower end of the reactor a coarse fritted glass disk was fused to the wall. This fritted glass disk acted as a distributor plate for the gas entering the reaction zone by way of a valved line below the glass disk. An entry point for a thermocouple was provided about 12 inches above the glass disk. Near the top of the reaction chamber a fill point was provided. A water-cooled condenser was connected to a gaseous effluent outlet of the reaction chamber.

The solid phosphoric acid used in the tests was UOP No. 2 polymerization catalyst made up in one-quarter inch cylindrical pellets. This acid used kieselguhr as the support. Analysis indicated that the solid prosphoric acid contained about 50% of acid calculated as phosphorous pentoxide. The pellets were added to the reactor to form a bed about 14 inches high.

In each of the tests, 500 ml. of aromatic hydrocarbon were added to the reactor; this amount completely covered the bed of solid phosphoric acid pellets. The pellets and the xylene were heated to the desired reaction temperature and then the solid phosphoric acid was saturated with $BF_3$ by passing $BF_3$ into the reaction chamber at a rate of about 80 ml. per minute. In all the tests, the pressure in the reaction zone was atmospheric. The saturation time was easily determined by the first appearance of $BF_3$ in the effluent from the condenser. Although the catalyst was saturated in about 5 minutes, the $BF_3$ was passed through the reactor for about 30 minutes.

Propylene was metered into the bottom of the reaction chamber below the fritted glass disk at a predetermined rate and the addition was continued for a predetermined time.

During those tests wherein $BF_3$ was added to the reaction zone while the propylene was being added, the $BF_3$ was metered into the line which introduced the propylene into the reactor so that the $BF_3$ and propylene entered the bottom of the reaction zone simultaneously.

At the end of the predetermined time, the reaction chamber was cooled to room temperature. The reaction product mixture consisting of unreacted aromatic hydrocarbon and alkylate and some propylene was drained into a separator funnel and washed with dilute caustic and water to remove $BF_3$. The neutral liquid was freed of water and fractionated through a 25 x 180 mm. glass column packed with metal saddles. Close boiling fractions were taken from the column and analyzed by physical characteristics and infrared spectrum.

TEST 1

In this test, xylene was treated with propylene in the absence of a solid phosphoric acid. The only catalyst was $BF_3$. The xylene was charged to the empty reaction zone and saturated with $BF_3$. Then the mixed stream of $BF_3$, 80 ml. per minute, and propylene was added to the reactor for a time of three hours. The results of this test are set out in Table I.

TEST 2

In this test, the solid phosphoric acid-$BF_3$ catalyst was used. The reactor was charged with the catalyst and with xylene as in the normal procedure described above. $BF_3$ and propylene were introduced at about the same rate as in Test 1 for a time of 2.5 hours. The results of this test are set out in Table I.

It is evident by the nearly doubled production of mono-isopropylxylene that the solid phosphoric acid-$BF_3$ catalyst in conjunction with the introduction of $BF_3$ is a vastly superior alkylation catalyst than $BF_3$ alone.

TESTS 3a AND 3b

These tests were carried out in a manner similar to that of Test 2, except that the mol ratio of propylene to xylene was varied. However, the time ratio was held constant in the two tests. The results of these tests are presented in Table I.

TESTS 4a–4d

In these tests, the alkylation reaction was carried out without introducing $BF_3$ into the reaction zone during the course of the alkylation reaction. That is, the solid phosphoric acid pellets and the xylene charged were saturated with $BF_3$ according to the method described. In Test 4a, propylene was added to the reaction zone over a period of one hour without adding $BF_3$; the reaction product mixture was drained from the reactor. In Test 4b, fresh xylene was added to the reactor containing the catalyst from Test 4a. Propylene was added for one hour and then the reaction product mixture withdrawn. In Test 4c, fresh xylene was added to the catalyst remaining from Test 4b and in Test 4d, fresh xylene was added to the catalyst remaining from Test 4c. The results obtained in each of these tests are shown in Table I.

*Table I*

| Test No. | 1 | 2 | 3 | | 4 | | | |
|---|---|---|---|---|---|---|---|---|
| | | | a | b | a | b | c | d |
| Time, Hours | 3 | 2.5 | 2 | 3 | 1 | 1 | 1 | 1 |
| Temperature, °C | 75–80 | 75–80 | 75–80 | 75–80 | 75–80 | 75–80 | 75–80 | 75–80 |
| Total $C_3$/Xylene, Mol Ratio | 0.7 | 0.72 | 0.31 | 0.47 | 0.4 | 0.4 | 0.4 | 0.4 |
| $C_3$/Xylene/Hr., Mol Ratio | 0.23 | 0.29 | 0.16 | 0.16 | 0.4 | 0.4 | 0.4 | 0.4 |
| Product, Wt. Percent of Xylene Charge: | | | | | | | | |
| Xylene (135–150°C.) | 53.5 | 39 | 60 | 57.5 | 77.5 | 90.5 | 94 | 96.5 |
| Isopropyl Xylene (193–205°C.) | 29 | 55 | 24.3 | 23.5 | 17 | 0 | 0 | 0 |
| Diisopropyl Xylene (230–245°C.) | 8 | 8 | 1.0 | 2.1 | 0 | 0 | 0 | 0 |
| Bottoms | 9 | 7 | 3.4 | 3.7 | 5 | 9.5 | 6 | 3.5 |

These tests show very clearly that the catalyst life of solid phosphoric acid-$BF_3$ is considerably less than one hour. In Tests 4b–4d no monoalkyate was produced and the yield of higher boiling material—bottoms—very rapidly decreased. A comparison of Tests 3 and 4 clearly show the superior results obtainable by the continuous introduction of $BF_3$ to the reaction zone during the period of alkylation reaction.

Thus having described the invention, what is claimed is:

1. An alkylation process which comprises (a) contacting, at constant pressure, a liquid aromatic hydrocarbon with propylene at a temperature between about 25° C. and 150° C., in the presence of a catalyst consisting of solid phosphoric acid saturated with $BF_3$, (b) continuously introducing $BF_3$ and said propylene into said contacting zone throughout the contacting time wherein the rate of $BF_3$ introduction is between 0.02 and 0.1 moles per mole of said aromatic hydrocarbon per hour of contacting time, (c) separating reaction product mixture from said catalyst and (d) recovering isopropyl-aromatic hydrocarbons from said mixture.

2. The process of claim 1 wherein said solid phosphoric acid comprises phosphoric acid deposited on a siliceous carrier.

3. The process of claim 1 wherein said aromatic is xylene.

4. An alkylation process which comprises (1) introducing into a reaction zone a catalyst consisting of solid phosphoric acid which has been saturated with $BF_3$ (2) introducing into said zone liquid xylene and propylene, (3) introducing $BF_3$ into said zone concurrently with said propylene at a rate of about 0.05 moles of $BF_3$ per mole of xylene per hour and wherein the external molar ratio of propylene to xylene is between about 0.1 and 2, (4) maintaining said zone at a temperature between about 70° and 100° C. at a constant pressure sufficient to maintain said xylene in the liquid state for a time sufficient to obtain the desired propylene consumption, (5) withdrawing a reaction product mixture from said zone and (6) recovering isopropyl-xylenes from said mixture.

References Cited in the file of this patent

UNITED STATES PATENTS

| | | |
|---|---|---|
| 2,018,065 | Ipatieff | Oct. 22, 1935 |
| 2,324,784 | Lieber | July 20, 1943 |
| 2,412,595 | Axe | Dec. 17, 1946 |
| 2,563,826 | Elwell et al. | Aug. 14, 1951 |